US007921200B2

(12) United States Patent
Dieberger et al.

(10) Patent No.: US 7,921,200 B2
(45) Date of Patent: Apr. 5, 2011

(54) APPARATUS, SYSTEM, AND METHOD FOR INTERACTION WITH MULTI-ATTRIBUTE SYSTEM RESOURCES AS GROUPS

(75) Inventors: Andreas Dieberger, Los Gatos, CA (US); Sandeep Gopisetty, Morgan Hill, CA (US); Eser Kandogan, Mountain View, CA (US); Cheryl Ann Kieliszewski, San Jose, CA (US); Roberto C. Pineiro, Mayaguez, PR (US); Chung-hao Tan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 651 days.

(21) Appl. No.: 11/346,834

(22) Filed: Feb. 3, 2006

(65) Prior Publication Data
US 2007/0198678 A1    Aug. 23, 2007

(51) Int. Cl.
*G06F 15/16* (2006.01)
(52) U.S. Cl. .................... 709/224; 709/223; 707/609
(58) Field of Classification Search .................. 709/223, 709/224; 707/1, 2, 3, 4, 6, 7
See application file for complete search history.

(56) References Cited

U.S. PATENT DOCUMENTS

| 5,706,501 | A | 1/1998 | Horikiri et al. ............... 395/610 |
| 5,845,270 | A | 12/1998 | Schatz et al. ................... 706/11 |
| 5,991,830 | A * | 11/1999 | Beard et al. ...................... 710/18 |
| 2002/0149601 | A1 | 10/2002 | Rajarajan et al. ............. 345/619 |
| 2004/0049566 | A1 * | 3/2004 | Mattila et al. ................. 709/223 |
| 2004/0167976 | A1 * | 8/2004 | Peer ............................... 709/223 |
| 2005/0114478 | A1 | 5/2005 | Popescu et al. ............... 709/220 |
| 2006/0004917 | A1 * | 1/2006 | Wang et al. .................... 709/223 |
| 2006/0010232 | A1 * | 1/2006 | Page et al. ..................... 709/223 |

FOREIGN PATENT DOCUMENTS

| CN | 1567295 | 1/2005 |
| CN | 1620655 | 5/2005 |

OTHER PUBLICATIONS

Microsoft Access Help File (Labled Access A-F). Microsoft. Oct. 21, 2003.*

* cited by examiner

*Primary Examiner* — William C Vaughn, Jr.
*Assistant Examiner* — Scott Christensen
(74) *Attorney, Agent, or Firm* — Kunzler Needham Massey & Thorpe (57) ABSTRACT

An apparatus, system, and method are disclosed for interacting with multi-attribute managed resources as groups. The apparatus, system and method identify in a repository one or more groups associated with a target attribute. The apparatus system and method further determine a set of managed resources from the repository wherein each managed resource in a set comprises the same value for the target attribute. The apparatus system and method further associate each set of managed resources with a group. The apparatus system and method may subdivide the groups into sub-groups according to additional attributes possessed by members of each group and may display the groups and sub-groups to summarize and highlight the managed resources of each group and sub-group.

35 Claims, 8 Drawing Sheets

APPARATUS, SYSTEM, AND METHOD FOR INTERACTION WITH MULTI-ATTRIBUTE SYSTEM RESOURCES AS GROUPS

BACKGROUND OF THE INVENTION

1. Field of the Invention

This invention relates to the grouping of networked resources and more particularly relates to organizing large numbers of networked resources into manageable groups according to attributes associated with each resource.

2. Description of the Related Art

Computer networks have evolved from isolated intranets to a worldwide system of routers, switches, servers, computers, and network devices comprising millions of network devices. A network device is any electronic device capable of communicating over a network with other electronic devices using a communications protocol, for example TCP/IP. Large organizations or enterprises such as banks, insurance companies, and government entities manage internal networks or intranets comprising thousands of network devices.

An enterprise's success depends on the successful management of its network devices. Successful management of network devices allows individuals in distant offices to communicate via email and voice over IP (VoIP) and also allows large enterprise information systems (EIS) to manage data throughout an organization. Unsuccessful management of an organization's resources results in disastrous interruptions in the basic functions of the organization. For example, the failure of a bank's network prevents automated teller machined (ATMs) from dispensing cash to customers and bank tellers from servicing the needs of walk-in bank customers.

An enterprise typically empowers a small department of network administrators with the task of managing its thousands of network devices. Success is measured by the number of hours per year that the network is available to all users of the network. Information technology (IT) management software exists to assist the network administrator in monitoring and managing the routers, switches, hubs, servers, and computers in an enterprise intranet. Typical IT management software packages display the status of individual routers, switches, and servers. For example, an administrator may review the system load experienced by a critical router using an IT management software tool. The tool may display the status of each link connected to the router and the traffic rate over each link. Advanced tools may alert the administrator to specific critical conditions, displaying a router whose utilization level is above 90% of capacity in red while displaying routers operating at 80% of capacity in yellow.

However, these IT management software tools do not provide custom groupings of network devices according to user-selected attributes. For example, an administrator may want to group the network devices running a specific operating system, for example servers running Red Hat® Linux Enterprise Server Version 3.0, and display that group. The administrator may want to define groups of displayed resources according to a dynamically chosen attribute to display a limited group of resources, for example the Linux Enterprise Server Version 3.0 servers in Los Angeles. The administrator may desire to assign specific attributes to particular network devices and group the assigned network devices according to the user-defined attributes. Additionally, the complexity and dynamic nature of the network may be such that an administrator is unaware of the different values for particular resource attributes. In this context, the administrator may desire to create groups based on the different possible values for attribute types. In other words, rather than grouping resources based on a known attribute value for the resource (referred to herein as "resource-centric" grouping), the administrator may desire to group resources based on an attribute type (referred to herein as "attribute-centric" grouping).

Unfortunately, currently available IT management software tools do not provide the ability to creat attribute-centric groupings of devices and to further segment groupings according to user-selected and user-defined attributes.

For the foregoing discussion, it should be apparent that a need exists for an apparatus, system, and method that provides a network administrator with the ability to create attribute-centric groupings of devices and to further segment groupings according to user-selected and user-defined attributes. Also, a need exists for a facility which allows a network administrator to manage individual network devices assigned to manage attribute-centric groupings without having to individually issue commands to each network device. Beneficially such an apparatus, system, and method would allow an IT administrator to monitor and manage more effectively a larger number of network devices.

SUMMARY OF THE INVENTION

The present invention has been developed in response to the present state of the art, and in particular, in response to the problems and needs in the art that have not yet been fully solved by currently available network monitoring devices. Accordingly, the present invention has been developed to provide an apparatus, system, and method for monitoring and managing network devices that overcome many or all of the above-discussed shortcomings in the art.

The apparatus to interact with multi-attribute system resources is provided with a plurality of modules configured to functionally execute the necessary steps of monitoring and managing multi-attribute managed resources as groups. These modules in the described embodiments include a repository of managed resources, a discovery module, and an association module.

The apparatus, in one embodiment, is configured to associate managed resources into groups according to one or more attribute values possessed by the managed resources for a specific attribute type.

The apparatus is further configured, in one embodiment, to associate managed resources into sub-groups. The criteria for the selection of attributes used for grouping managed resources into sub-groups may include the importance of the attributes, historical use patterns, and configuration parameters.

In a further embodiment, the apparatus maybe configured to display groups in an expanded format or a collapsed format. In the collapsed format, the sub-groups may be summarized using an indicator for each sub-group.

In a further embodiment, the apparatus maybe configured to display groups of resources in an expanded format in response to the selection of a managed resource associated with members of a particular group to be displayed in the expanded format. The apparatus may further be configured to select the resources associated with the selected resource.

A system of the present invention is also presented to monitor and manage multi-attribute managed resources as groups. In particular, the system, in one embodiment, includes a computer network comprising a plurality of managed resources and an administration tool comprising a repository, a discovery module, and an association module.

A method of the present invention is also presented for monitoring and managing multi-attribute managed resources as groups. The method in the disclosed embodiments substantially includes the steps necessary to carry out the functions presented above with respect to the operation of the described apparatus and system. In one embodiment, the method includes identifying in a repository one or more groups associated with a target attribute. The method also may include determining a set of resources for each target attribute value and associating each set of resources with a group.

In a further embodiment, the method includes dynamically monitoring the target attribute values for each resource and re-associating resources with the group that has the new target attribute value.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of causing execution of a program of machine-readable instructions on a digital processing apparatus. A computer readable medium may be embodied by, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
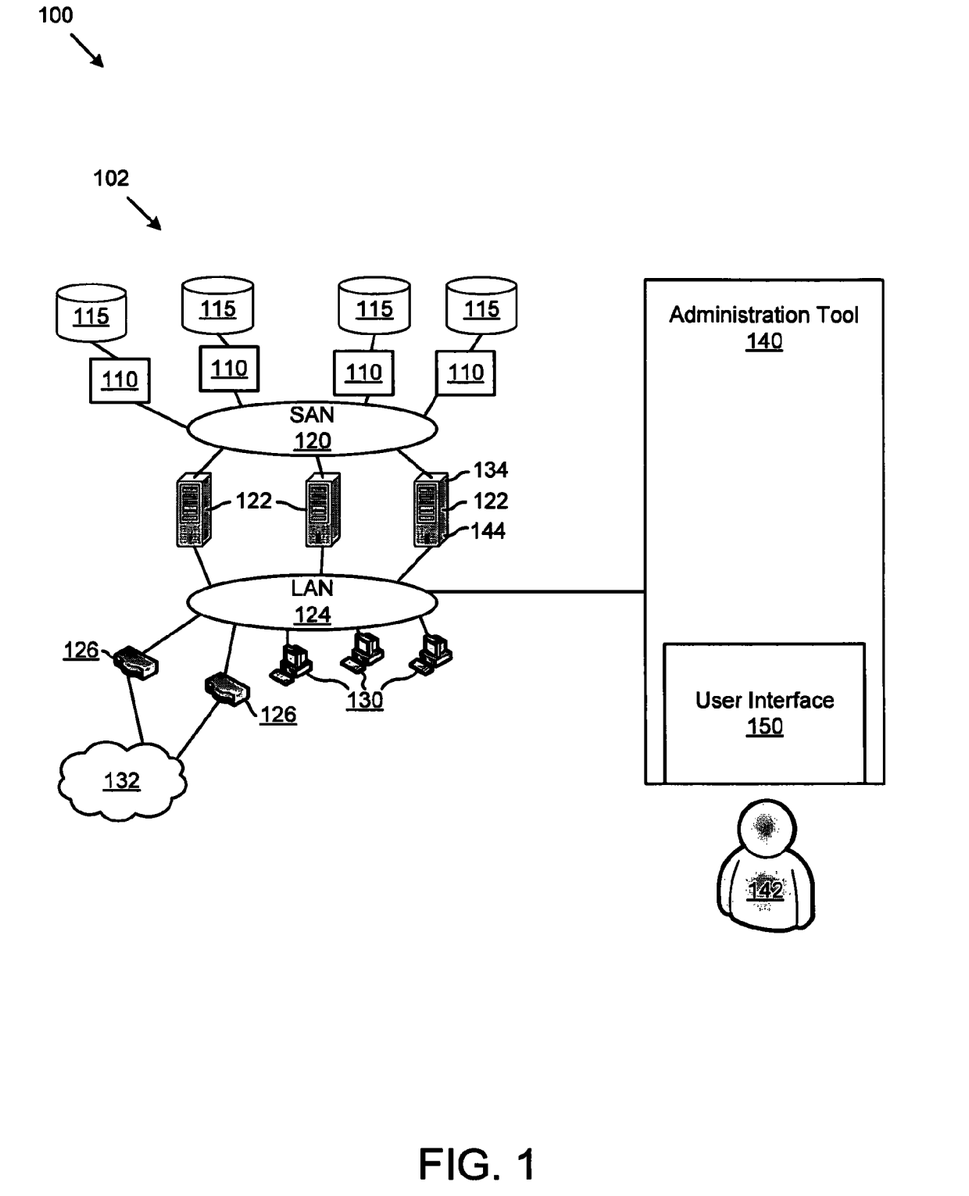
FIG. 1 is a schematic block diagram illustrating one embodiment of a computer network in accordance with the present invention.

FIG. 1 depicts a system 100 for interaction with multi-attribute system resources as groups. The system 100 comprises a computer network 102 and an administration tool 140.

A computer network 102 may be a private intranet, a shared network 102 comprising an intranet and an extranet or the entire Internet. The network 102 may comprise storage arrays 115, storage servers 110, storage area networks (SANs) 120, servers 122, local area networks (LANs) 124, routers 126, computers 130, and the like. Although a network 102 is often referred to as a computer network 102, the network 102 need not comprise computers. The network 102 of FIG. 1 may also connect to a wide area network 132, to other networks 102, to associated intranets, extranets and to the Internet.

Each device on the network 102 is a network device 134. A network device 134 may be a storage array 115, a storage server 110, a router 126, a computer 130, a server 122, or other devices capable of communication over the network 102. A network device 134 may also be termed a resource or a managed resource. A resource, a managed resource, or a network device 134 may be a computing resource or may comprise one or more can computing resources. A network device 134 is a computing resource. A storage server 110 and a storage array 115 are computing resources. A storage array 115 may communicate on the network 102 to a storage server 110. Alternatively, a storage array 115 may connect directly to a storage server via a point-to-point fiber-optic channel, a bus and tag channel, a high-speed serial connection, an extended integrated drive electronics (EIDE) connection, or other direct connection. In other words, some computing devices such as a storage array 115 may not be visible on the network 102. However, such computing devices may be monitored and managed over a network.

Typically, a single enterprise manages its own network 102 as an intranet for the use of its own employees. An enterprise network 102 may comprise hundreds, thousands, or tens of thousands of network devices 134. An enterprise may assign a group of employees or IT administrators 142 to manage its network 102. The IT administrators 142 use various networking tools to monitor and manage the enterprise network 102.

An enterprise such as a commercial business, a government entity, or other organization uses a network 102 to carry out the purposes of the enterprise. An enterprise may store customer data, account information, business plans, databases, and the like on storage arrays 115 accessible over the network 102. The network 102 may carry voice traffic as well as data traffic. Failure of the network 102 may cripple the enterprise. Many enterprises depend on their networks 102 to be down for no more than a few hours each year.

The IT administrators 142 monitor all aspects of the network 102 and the network devices 134 attached to the network 102 using the administration tool 140 of the present invention. One embodiment of the administration tool 140 comprises an administration tool 140 and a user interface 150. The administration tool 140 allows an IT administrator 142 to examine the large numbers of network devices 134 in the network 102 using an attribute-centric view of the network devices 134.

An attribute-centric view provides the IT administrator 142 with one or more attributes associated with each network device 134. For example, a server 122 may have several attributes including operating system type, operating system patch level, machine type, physical location, user-defined types, installed memory capacity, free disk space, and the like. The administration tool 140 provides a user interface 150 through which the IT administrator 142 selects one or more attributes 144. The attributes 144 provided by the administration tool 140 may be dynamically determined by the administration tool 140. The administration tool 140 may gather attributes 144 and attribute values based on the attributes 144 and attribute values possessed by network devices 134 in the network 102. The administration tool 140 displays in the user interface 150 an attribute-centric view of the network 102 organized in accordance with the selected attributes 144.

The administration tool 140 assists the IT administrator 142 to monitor and analyze the network devices 134 and the computing resources in the network 102. The administration tool 140 allows the IT administrator 142 to monitor thousands of computing resources and manage the computing resources. Using an attribute-centric approach, the IT administrator 142 may easily view all of the computing resources and network devices 134 comprising a single attribute 144 or comprising a selected group of attributes 144. The IT administrator 142 may also use the administration tool 140 to quickly receive summary information about groups of network devices 134 and sub-groups of network devices 134. In addition, the IT administrator 142 may issue commands to groups of network devices 134 according to the selected attributes 144.

Figure 2A:
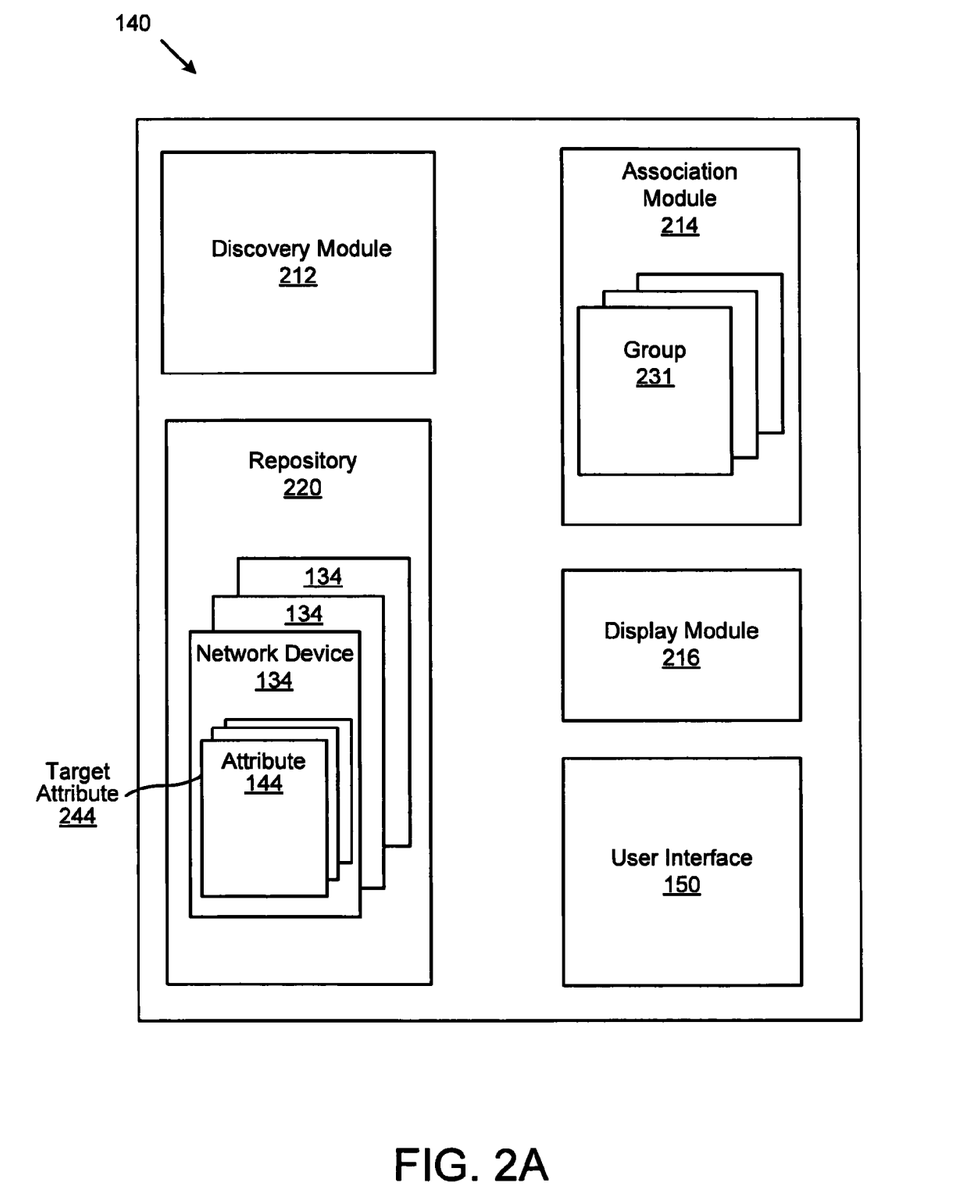
FIG. 2A is a schematic block diagram illustrating one embodiment of an administration tool in accordance with the present invention.

FIG. 2A illustrates one embodiment of the administration tool 140 in accordance with the present invention. The administration tool 140 comprises a discovery module 212, an association module 214, a display module 216, and a repository 220.

The repository 220 comprises a representation of computing resources and the network devices 134 in the network 102. The repository 220 may comprise a database or may simply comprise a representation of each network device 134 in the physical memory of the administration tool 140. The repository 220 provides attribute information about network devices 134 to the administration tool 140. The repository 220 may query individual network devices 134 in the network 102 to obtain attribute information or, alternatively, may query another repository 220 separate from the administration tool 140 to obtain current attribute information for the network devices 134.

The repository 220 provides to the administration tool 140 attribute information about network devices 134 in the network 102. The repository 220 may also track the values of the attributes 144 found in the network and organize groups according to the various attribute values. For example, one attribute might determine the operating system type of the servers 122 in the network 102. If the network comprises some servers 122 running Windows®, some servers 122 running Linux, and some servers 122 running OS/2®, the repository 220 recognizes four different groups, based on the attribute values found in the network 102: a Windows group, a Linux group, an OS/2 group, and a group running neither Windows, Linux, nor OS/2.

The discovery module 212 determines which network devices 134 exhibit or comprise particular attribute 144 values. The discovery module 212 queries the computing resources and the network devices 134 to discover and determine the attributes possessed by each network device 134. The discovery module 212 may populate the repository 220 with the attribute values found during the discovery process. The discovery module 212 may partition the network devices 134 into sets of network devices 134 according to the attribute 144 values possessed by each network device 134. The IT administrator 142 may select one or more target attributes 244 that the discovery module 212 uses to automatically form sets of network devices 134. Alternatively, the discovery module 212 may use configuration parameters to determine target attributes 244.

The discovery module 212 may also use historical use patterns to determine the particular target attributes 244. For example, if one IT administrator 142 typically requests to see network devices 134 grouped according to operating system type when managing network devices 134 in Los Angeles, the discovery module 212 may select target attributes 244 according to the historical preference for operating system type. Similarly, the same IT administrator 142 may request network devices 134 groupings according to network traffic levels when viewing network devices 134 in Seattle. The discovery module 212 may track such historical use patterns and display and group network devices 134 in Seattle according to an IT administrator's 142 historical use patterns distinct from the historical use patterns for network devices 134 in Los Angeles.

The discovery module 212 may rely on a database or repository 220 to store values for attributes 144 for each network device 134. Alternatively, the discovery module 212 may directly query network devices 134 to determine current values for attributes 144. For example, the discovery module 212 may determine the operating system version for all Windows-based network devices 134 in the network 102. In this example, the discovery module 212 may determine values for an operating system attribute 144 and an operating system version attribute 144. The discovery module 212 may create three sets of network devices 134 comprising network devices 134 running Windows XP®, Windows 2000 Server®, and Windows 2000 Professional®, respectively. The discovery module 212 may further determine a version number and patch level for each of the network devices 134 in each set. In some embodiments, the discovery module 212 may determine members of sub-sets. For example, the set of Windows XP servers maybe sub-divided into subsets according to the city in which the server is located.

The association module 214 forms sets of network devices 134, determined by the discovery module 212 into distinct groups 231. Each group 231 comprises network devices 134 having the same value for a particular target attribute 244. The association module 214 may track the membership of each group 231 or, alternatively, may utilize a database or repository 220 to track group membership. The association module 214 manages the creation of groups 231, the assignment of network devices 134 to groups 231, and the updating of group membership. The association module 214 may query the discovery module 212 or may query the repository 220 after the repository 220 has been populated by the discovery module 212.

In some instances, the association module 214 may form groups 231 having no members. For instance, if the target attribute 244 is operating system version and a network device 134 is running Linux, the association module 214 may form one group 231 for network devices 134 that run Linux and another group 231 for network devices 134 that do not run Linux even if all the network devices 134 run Linux. In addition, the association module 214 may be configured to expect specific attribute values. For example, in forming groups 231 according to an operating system target attribute 244, the association module 214 may be configured to form groups 231 for Linux, Windows, and Unix machines. Even though no network devices 134 running Unix exist in the network 102, the association module 214 may form an empty group 231 for Unix network devices 134. However, generally, the administration tool 140 forms groups based on attribute values that exist among the network devices 134 of the network 102.

The association module 214 in coordination with the discovery module 212 may also track dynamic changes to group membership. For example, the discovery module 212 may determine that the operating system of a network device 134 has changed. The association module 214 may update group membership in accordance with this change. In some embodiments, the association module 214 may further form sub-groups according to the sub-set associations determined by the discovery module 212.

The display module 216 manages the display of groups 231 and their respective network devices 134. The display module 216 receives requests through the user interface 150 and fulfills those requests using the groups 231 of the association module 214, the sets of the discovery module 212, and the networks resources 134 of the repository 220. The display module 216 may format output for a computer display, for a printed report, or for other output media. The display module 216 formats the display output according to the requirements from the IT administrator 142, configuration parameters, and historical use patterns. The display module 216 balances the need to display the plethora of information available about each network device 134 and each group 231 against the real estate available on a computer screen or a report and the value provided by focusing the attention of the IT administrator 142 on important details.

For example, the display module 216 may display one hundred members of each of five groups 231 or may alternatively display a summary for each of the five groups 231, listing a count of the members for each group 231. The display module 216 may highlight one group 231 containing a member whose memory utilization exceeds a desired threshold while deemphasizing four other groups 231 that do not have any members with high memory utilization.

The user interface 150 provides input and output mechanisms for the IT administrator 142 to access the administration tool 140. The user interface 150 may comprise a computer screen, a keyboard, a mouse, various menus and computer windows, printers, and the like that allow the IT administrator 142 to communicate with the administration tool 140. The IT administrator 142 may use the user interface 150 not only to monitor the status of the various network devices 134, but also to issue commands to manage and control the network devices 134.

Figure 2B:
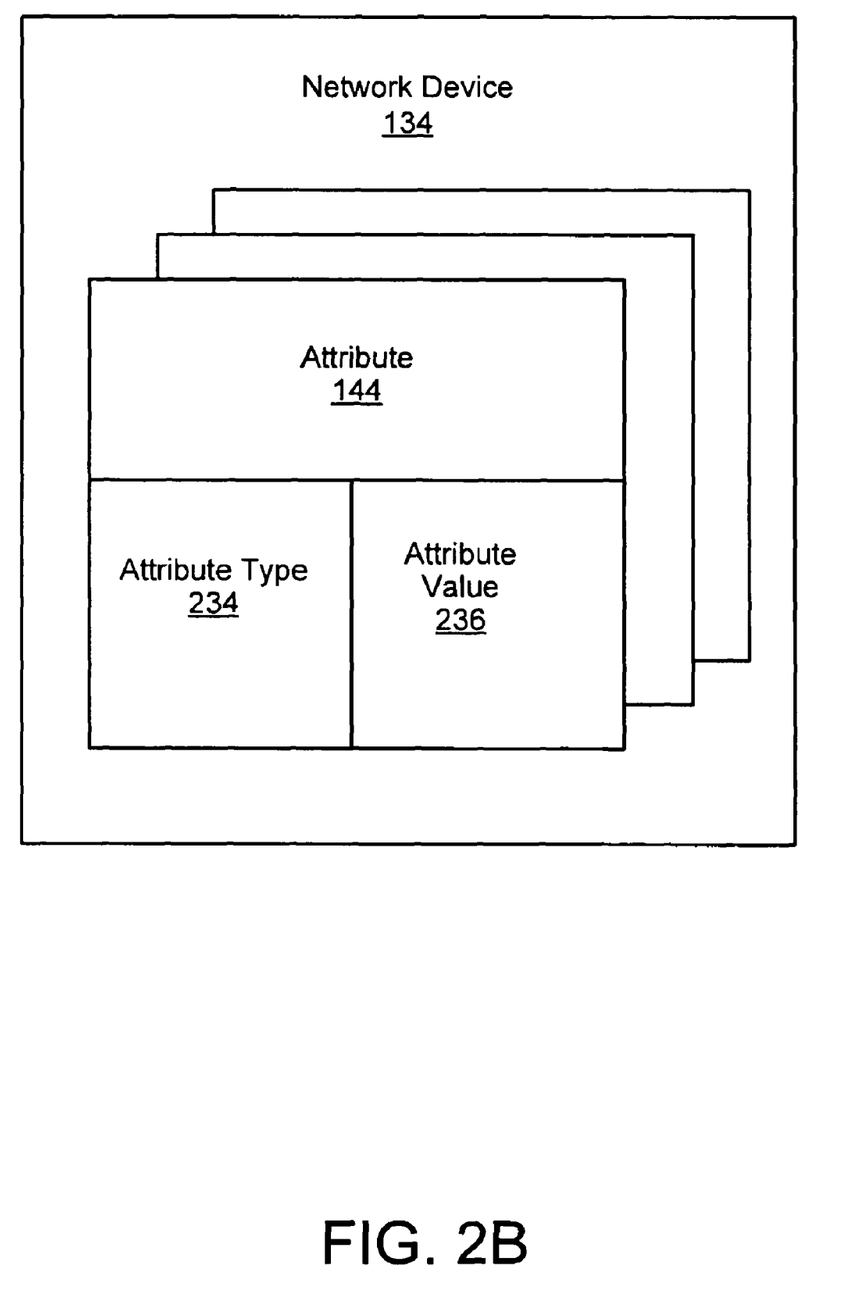
FIG. 2B is a schematic block diagram illustrating one embodiment of a data structure associated with an administration tool in accordance with the present invention.

FIG. 2B illustrates one embodiment of a representation of a network device 134 maintained by the repository 220. Each network device 134 comprises one or more attributes 144 also termed resource attributes. An attribute 144 may comprise an attribute type 234 and an attribute value 236. As an example, the repository 220 may track attributes 144 associated with routers in the network. A router is a network device 134 that routes network packets among various LANs 124 and WANs 132 to which the router is connected. One attribute 144 may track an Internet address of the router which might be a period separated series of four decimal numbers, for example, 192.168.1.1. The attribute type 234 is the name of the tracked attribute 144 and the attribute value 236 is the value of the tracked attribute 144. In this example, the attribute type 234 is "Internet address," and the attribute value 236 is "192.168.1.1." For purposes of this application, network devices 134 having the same attribute 144, refers to network devices 134 having equivalent attribute values 236.

Although not required, it maybe useful to categorize the attribute types 234 of the network devices 134 into the following categories: physical attributes, system attributes, environment attributes, operational attributes, interface attributes, static attributes, dynamic attributes, and user-defined attributes. Physical attributes may include installed memory capacity, hard disk size, central processing unit (CPU) speed, and the like. System attributes may include operating system, operating system version number, operating system patch level, application programs installed, and the like. Environment attributes may include the physical location of the network device 134, the ambient temperature in the room, the CPU temperature, and the like. Operational attributes may include the time at which the network device 134 was last rebooted, the user names of users currently logged into the network device 134, the Internet address of the network device 134, and the like. Interface attributes may include presentation features such as a highlighted interface or a selected interface as well as whether an interface is enabled or disabled.

Static and dynamic attributes may include subsets of other attributes. For example, the CPU temperature may be a dynamic attribute while the operating system may be a static attribute. User-defined attributes are those attributes which a user or IT administrator 142 creates. For example, a router 126 may report the number of packets that the router 126 has processed since its last reboot. An IT administrator 142 may want to know how many packets have been processed in the last hour. The IT administrator 142 may configure the administration tool 140 to dynamically calculate the number of packets processed in the last hour using the number of packets processed since the last reboot as input into the calculation. A user-defined attribute may be created simply by selecting a network device 134 with a mouse-click or a user-defined attribute may be a name or label associated with a network device 134.

The precise categorization of attributes 144 maybe implementation specific. Some attributes 144 may be system attributes, dynamic attributes, and environment attributes. Others may only fall into one category. The administration tool 140 may use attribute categories to group attributes 144 for display and selection. The present invention functions regardless of how certain attributes 144 may be categorized.

Figure 3:
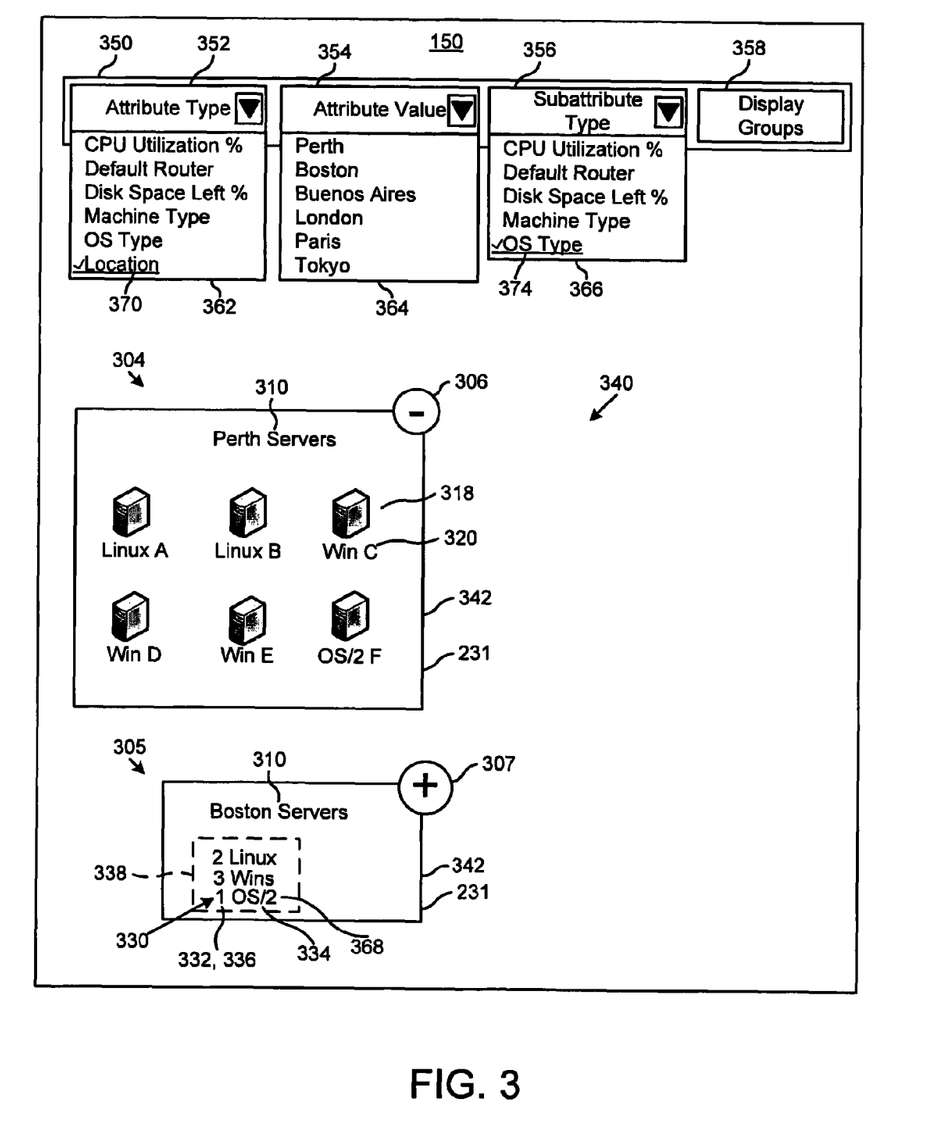
FIG. 3 is a schematic block diagram illustrating one embodiment of a graphical user interface associated with the administration tool in accordance with the present invention.

FIG. 3 illustrates selected aspects of a user interface 150 in accordance with one embodiment of the present invention. The depicted user interface 150 comprises a menu bar 350 and various visual containers 342 of groups 231. The user interface 150 is generally a graphical user interface. However, alternatively, the user interface 150 may be textual in nature. The user interface 150 provides the IT administrator 142 with an interface to the administration tool 140. The design of the user interface 150 considers the limited screen real estate available on a typical computer display and tries to maximize the utility of the available screen real estate. In order to optimize the screen utilization, the display module 216 filters some groups 231 summarizes other groups 231 according to the configuration parameters set in the administration tool 140, historical use patterns, and the number of groups 231 and network devices 134 available for display.

The illustrated menu bar 350 is one embodiment of a menu bar 350 that may be used in connection with the present invention. Many other menu bar 350 configurations may be used and designed by those of skill in the art without departing from the spirit of the present invention. The illustrated menu bar 350 comprises an attribute type pull down menu 352, an attribute value pull down menu 354, a sub-attribute type pull down menu 356, and a display groups button 358.

The attribute type pull down menu 352 comprises an attribute type list 362. The attribute type list 362 provides a listing of the attribute types 234 available for display. The listed attribute types 234 correspond to attributes 144 possessed by network devices 134 in the repository 220. The attribute type list 362 may be updated dynamically based on the network devices 134 currently available in the repository 220. Further, the IT administrator 142 may define additional user-defined attribute types 234. The IT administrator 142 may select a target attribute type 370 for display in the current view. In the illustrated example, the IT administrator 142 has a target attribute type 370 of "Location."

The attribute value pull down menu 354 comprises an attribute value list 364. The attribute value list 364 provides a listing of the attribute values 236 available in the network devices 134 of the current view. In the illustrated attribute value list 364, seven possible attribute values 236 for the selected target attribute type 370 of location are displayed in the attribute value pull down menu 354, namely Perth, Boston, Buenos Aires, London, Paris, and Tokyo. The available network devices 134 are located in these seven locations.

The sub-attribute type pull down menu 356 comprises a sub-attribute type list 366. The sub-attribute type pull down menu 356 may comprise the remaining non-selected attributes 144 from the attribute type pull down menu 352, or it may comprise attributes 144 traditionally reserved for the sub-attribute type pull down menu 356. The IT administrator 142 may select a target sub-attribute type 374. Alternatively, the administration tool 140 may select a configured target sub-attribute type 374 or may select a target sub-attribute type 374 based on historical use patterns. The display module 216 may use the target sub-attribute type 374 for summary displays as described below. In some embodiments of the administration tool 140 and the user interface 150, the administration tool 140 may select or may allow for the selection of a plurality of target attribute types 370 and a plurality of target sub-attribute types 374.

The display groups button 358 provides a command interface for the IT administrator 142. Upon pressing or clicking the display groups button 358, the user interface 150 presents a visual representation 340 of the groups 231 available for display.

The user interface 150 may display groups 231 in visual containers 342 as shown. The visual containers 342 of the illustrated user interface 150 illustrate an expanded format 304 and a collapsed format 305.

The expanded format 304 may comprise a group label 310, a collapse button 306, and various network devices 134 displayed using a device icon 318 and a device label 320. The visual container 342 may be a window or pane typical of graphical display systems. The group label 310 displays a label for the group, typically incorporating the value of the target attribute type 370 for the particular group 231, for example, "Perth Servers" incorporating the location of the servers into the group label 310.

The device icon 318 may display a graphical icon for the type of network device 134. Alternatively, the device icon 318 may be a status flag, bar chart, color-coded icon or other icon selected to report status or attribute information about the network device 134. The device label 320 typically reports a user-defined label or name for the network device 134.

The collapsed format 305 may comprise a group label 310, an expand button 307, and a summary 338 of the members of the group 231 grouped according to a target sub-attribute type 374. The summary 338 may comprise one or more indicators 330 that represent the members of various sub-groups 368. For example, the Boston Servers may be subdivided into sub-groups 368 of Linux, Windows, and OS/2 servers. The summary 338 may display an indicator 330 for each sub-group 368. The indicator 330 may comprise a token 332 and a name 334. In the example, the first indicator 330 in the summary 338 is "2 Linux." The token 332 is illustrated by the number "2" and the name 334 is illustrated by the label "Linux." In this case, the token 332 is a count 336, representative of the number of network devices 134 in the sub-group 368 of Linux servers in Boston.

The token 332 maybe a count 336 or some other indicator 330 representative of the members of the sub-group 368. For example, the token may be a bar chart, status flag, highlighted label, flashing label, an animation, an icon, or other device representative of the members of the sub-group 368 or a combination thereof.

The user interface 150 may provide command functionality as well as display functionality. For example, an IT administrator 142 may right click on a device icon 318 or device label 320 and receive a list of commands that may be issued with respect to a particular device. Similarly, an IT administrator 142 may obtain a list of commands for a sub-group 368 or an entire group 231. For example, an IT administrator 142 may right click on a group label 310 and select a "reboot" command from a list of possible commands that causes all of the network devices 134 in the group 231 to reboot.

In the expanded format 304, various network devices 134 are displayed using a device icon 318 and a device label 320. The visual container 342 may be a window or pane typical of graphical display systems. The group label 310 displays a label for the group, typically incorporating the value of the target attribute type 370 for the particular group 231, for example, "Perth Servers" incorporating the location of the servers into the group label 310.

The device icon 318 may display a graphical icon for the type of network device 134. Alternatively, the device icon 318 may be a status flag, bar chart, color-coded icon or other icon selected to report status or attribute information about the network device 134. The device label 320 typically reports a user-defined label or name for the network device 134.

Figure 4:
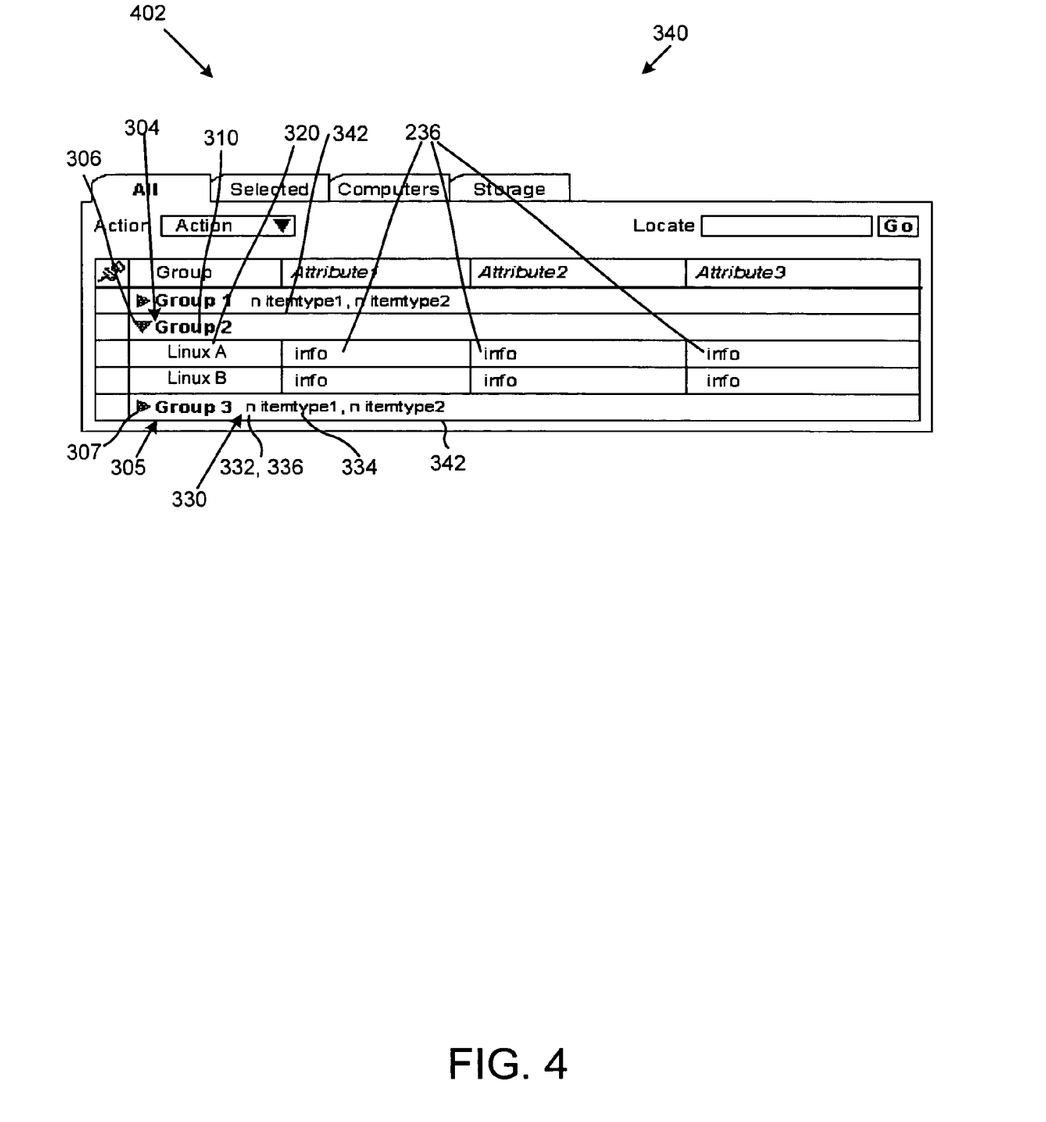
FIG. 4 is a schematic block diagram illustrating one embodiment of a tabular user interface associated with the administration tool in accordance with the present invention.

FIG. 4 illustrates a tabular user interface 402, another embodiment of a user interface 150 in accordance with the present invention. The tabular user interface 402 formats many of the elements of the user interface 150 of FIG. 3 in a tabular format. The elements from FIG. 3 with equivalent names serve the same purposes as described with respect to the user interface 150 of FIG. 3.

The tabular user interface 402 provides visual containers 342 having an expanded format 304 and a collapsed format 305. The expanded format 304 may comprise a collapse button 306 and a group label 310. Each group 231 may comprise one or more network devices 134 illustrated using a device label 320 and various attribute values 236.

The collapsed format 305 may comprise an expand button 307 and an indicator 330. The indicator 330 may comprise a token 332 or count 336, a name 334, and a visual container 342.

Figure 5A:
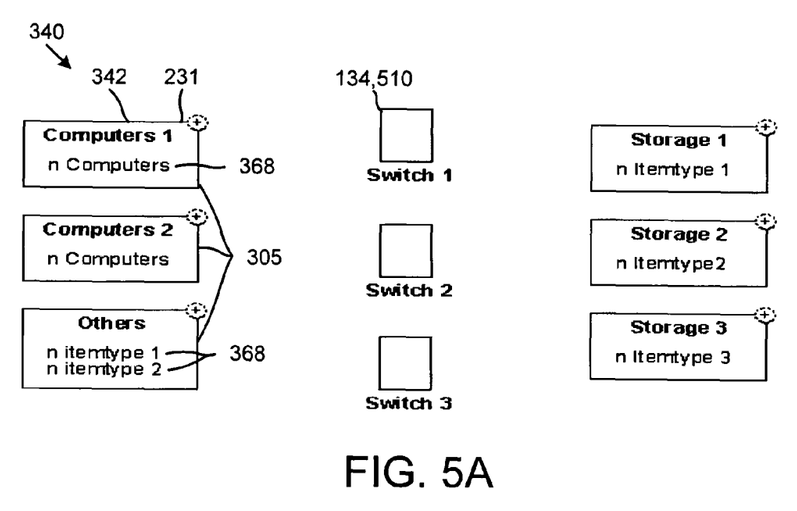
FIG. 5A is a schematic block diagram illustrating one embodiment of a graphical display created in accordance with the present invention.

FIG. 5A illustrates a visual representation 340 of six visual containers 342 and three network devices 134 called switches 510. The visual containers 342 represent six groups 231 organized according to attribute values 236 of the members of each group 231. The groups 231, labeled "Computers 1," "Computers 2," "Storage 1," "Storage 2," "Storage 3," and "Others," each comprise one or more sub-groups 368 shown in a collapsed format 305. The three switches 510 are displayed as individual network devices 134.

Figure 5B:
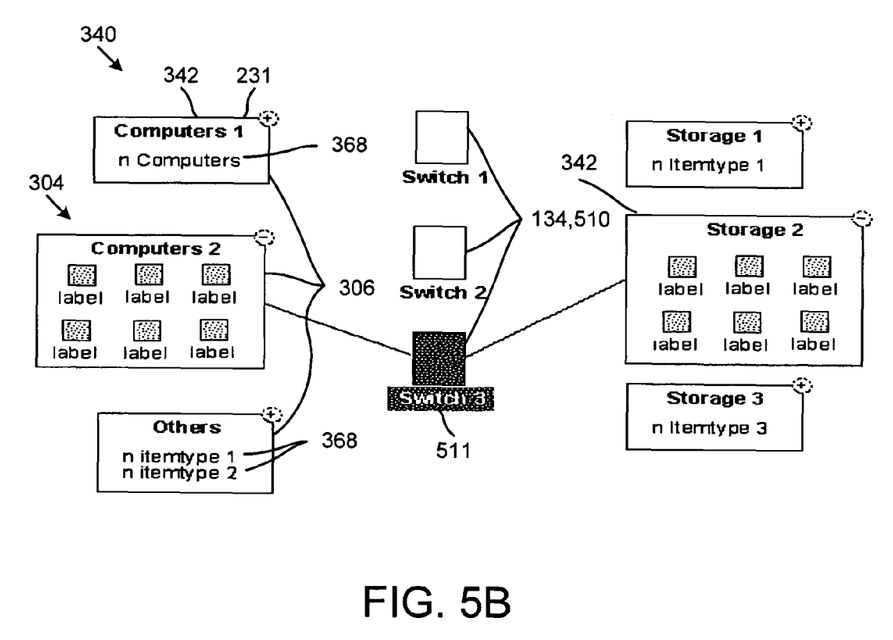
FIG. 5B is a schematic block diagram illustrating one embodiment of a graphical display created in accordance with the present invention.

FIG. 5B illustrates a second view of the network devices 134 and groups 231 of FIG. 5A. FIG. 5B illustrates an auto-expand feature of the present invention. Each of the network devices 134 of the various groups 231 or visual containers 342 may connect to a network 102 via a switch 510. However, the display of FIG. 5A does not illustrate which groups 231 of network devices 134 connect through a particular switch 510. FIG. 5B shows that an IT administrator 142 may select switch 511 labeled "switch 3." In response to the selection of switch 511, the discovery module 214 in coordination with the repository 212 locates all of the network devices 134 that connect to the network 102 through switch 511 and displays their respective visual containers 342 in an expanded format 304. In FIG. 5B, the groups 231 labeled "Computers 2" and "Storage 2" both comprise at least one network device 134 that connects to the network 102 through switch 511. Consequently, these two groups 231 are shown in an expanded format 304. In this manner, an IT administrator 142 may cause various groups to auto-expand from a collapsed format 305 to an expanded format 304.

Figure 5C:
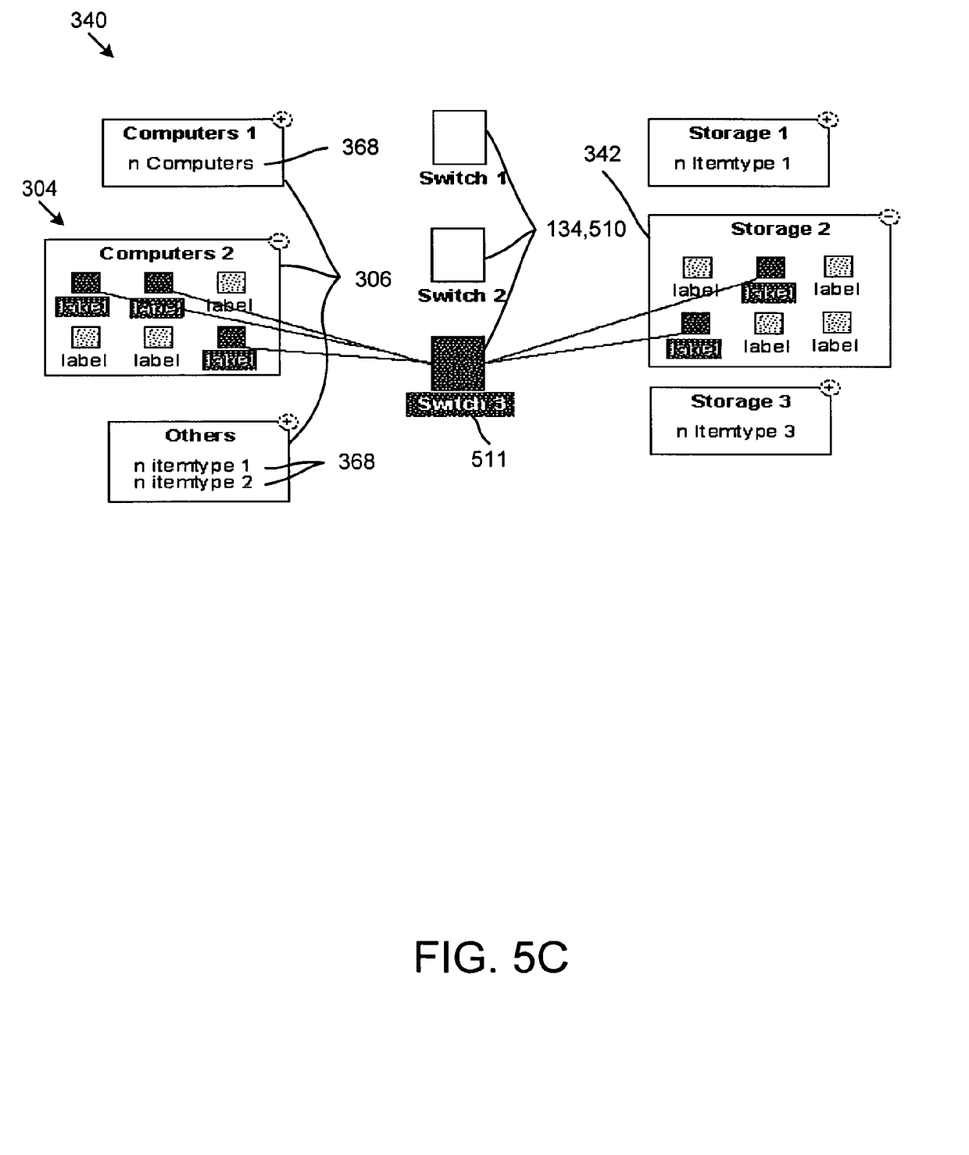
FIG. 5C is a schematic block diagram illustrating one embodiment of a graphical display created in accordance with the present invention.

FIG. 5C illustrates a third view of the network devices 134, visual containers 342, and groups 231 of FIG. 5A. FIG. 5C illustrates the use of selection to modify attribute values 236. To achieve the auto-expansion of FIG. 5C, the IT administrator 142 may have single-clicked the switch 3 switch 511. However, in FIG. 5C, a different type of selection is made, perhaps the IT administrator 142 right-clicks on the previously selected switch 511 and subsequently selects an attribute-selection command. The administration tool 140 tracks attribute types 234 and attribute values 236 associated with each network device 134 and uses the attribute values 236 to form the network devices 134 into groups 231 and sub-groups 368.

Some attribute types 234 and attribute values 236 may be user-defined by the IT administrator 142. In the example illustrated in FIG. 5C, issuing an attribute selection command on switch 3 causes the discovery module 212 to query the repository 220 to determine all of the network devices 134 that possess the "linked to" attribute value 236 equal to "switch 3." The association module 214 may form a new group 231 of the network devices 134 that are returned by query of the discovery module 212.

The network devices 134 that connect to the network 102 through switch 511 to form a new group and are shown as selected by their highlighted status in the FIG. 5C. Selection is a user-defined attribute type 234. The selection or non-selection of a network device 134 modifies the selection attribute value 236. The IT administrator 142 may subsequently form an explicit group 231 of the network devices 134 that are selected, for example of the three highlighted network devices 134 in the "Computers 2" group, the two network devices 134 in the "Storage 2" group and the switch 510 labeled "Switch 3.38 In this manner, an IT administrator 142 may modify the attribute values 236 and form new groups 231. The IT administrator 142 may define attribute types 234 according to a selection scheme, or through other mechanisms, for example assigning a name to a network device 134 or defining a new performance parameter to be tracked for each network device 134.

Figure 6:
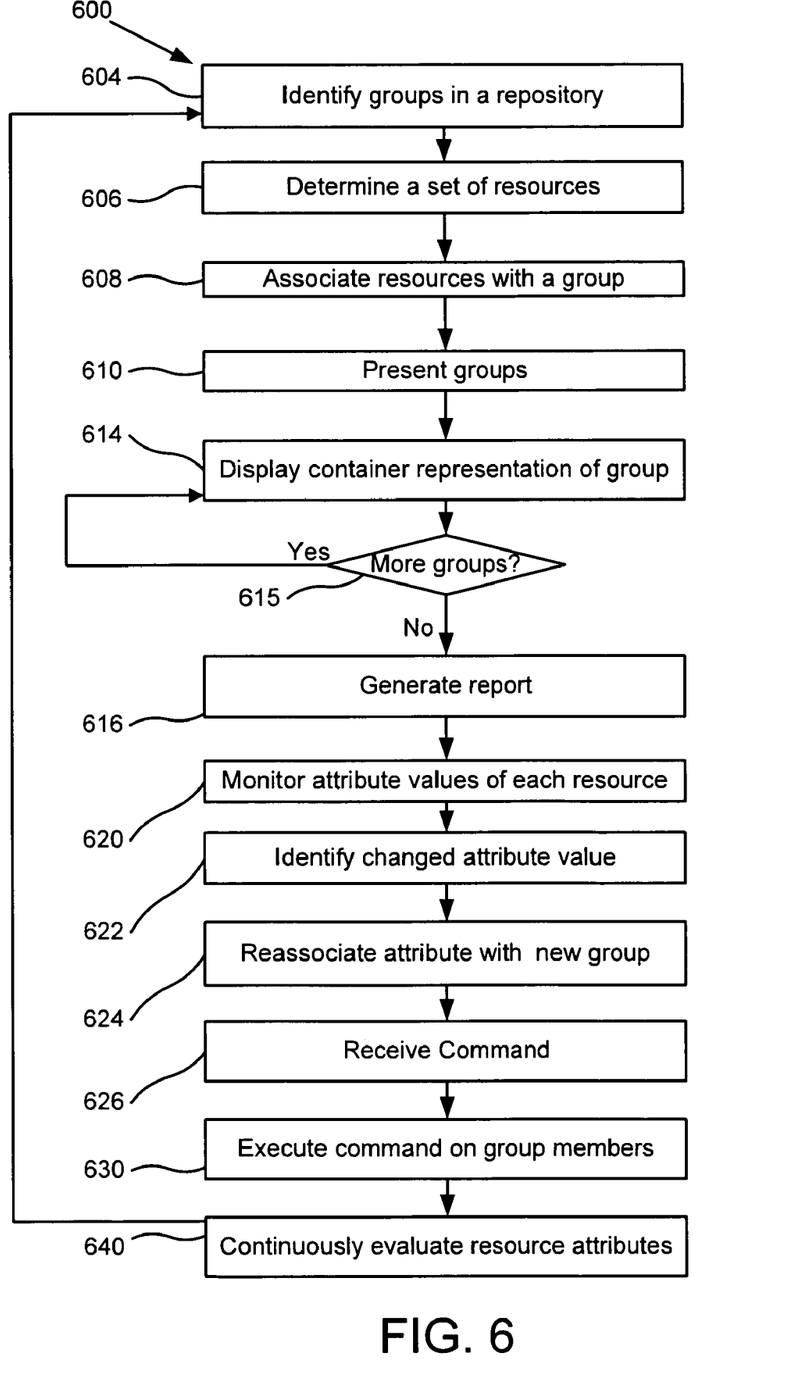
FIG. 6 is a schematic flow chart diagram illustrating one embodiment of a method to mange and monitor managed resources in accordance with the present invention.

FIG. 6 illustrates one embodiment of a method 600 for interacting with multi-attribute system resources as groups.

The method 600 comprises identifying 604 one or more groups 231 for a given target attribute 244. An IT administrator 142 may select the target attribute 244 or the target attribute 244 may be selected from a group of attribute types 234 present in a set of network devices 134 in a repository 220. An IT administrator 142 may select a plurality of attribute types 234 to form a composite target attribute 244.

A discovery module 212 determines 606 one or more sets of resources or network devices 134, each set comprising network devices 134 having a single attribute value 236 for the target attribute 244. In the case of a composite target attribute 244, the discovery module 212 determines one or more sets of network devices 134 having the same attribute value 236 for a plurality of attribute types 234 making up the composite target attribute 244.

The association module 214 associates 608 the network devices 134 from each set into a group 231. The association module 214 in certain embodiments may further identify sub-groups 368 within each group 231 according to the attribute types 234 and attribute values 236 possessed by each member of a particular group 231.

The display module 216 displays or presents 610 the various groups 231 and sub-groups 368 that the association module 214 formed. The display module 216 may use various media and devices to present 610 the groups 231 to an IT administrator 142 using a user interface 150 in an effective manner.

In presenting 610 the groups 231, the display module 216 may display 614 each group 231 in a visual container 342 in an expanded format 304 or a collapsed format 305 depending on the number of groups 231 to be displayed, the screen real estate available, display configuration parameters, historical use patterns, and the values of certain attributes 144 to be displayed. For example, the display module may highlight network devices 134 whose memory utilization exceeds a certain level. The association module 214 may highlight a network device 134 by showing its group 231 in an expanded format 304 or by modifying an indicator 330 associated with a group 231 or sub-group 368 of which the network device 134 is a part.

As the display module 216 displays 614 each group 231 in a visual container 342, the display module 216 checks 615 to determine if all groups 231 have been displayed. The display module 216 continues displaying 614 the visual containers 342 for each group 231 until each group 231 has been presented.

The display module 216 may further generate 616 a report based on the groups 231, the sub-groups 368, the network devices 134 and their respective attribute values 236. The display module 216 may use formatting techniques to highlight important attribute values 236 of the various network devices 134.

The discovery module 212 may monitor 620 the attribute values 236 of the various network devices 134 in the network 102. As attribute values 236 change, the discovery module 212 may identify 622 changed attribute values 236 and assign network devices 134 to different sets of network devices 134 and the association module 214 may re-associate 624 affected network devices 134 with different groups 231 of network devices 134. In this manner, the discovery module 212 dynamically monitors 620 the network devices 134 and identifies 622 changed attribute values 236.

The user interface 150 of the administration tool 140 may receive 626 a command from an IT administrator 142 for a particular network device 134, sub-group 368, or group 231. The administration tool 140 executes 630 the command on the associated network devices 134. Examples of commands that an IT administrator 142 may issue through the administration tool 140 include rebooting network devices 134, applying software updates to network devices 134, displaying the resources associated with a visual container 342, modifying access rights for network devices 134 associated with a visual container 342, and issuing backup commands to network devices 134 associated with a visual container 342.

Throughout the method, the administration tool 140 continuously evaluates 640 the devices 134 in the network. This process of continuous refinement identifies 604 new groups in the repository, determines 606 new sets of resources and so forth. The method 600 is attribute-centric, focusing on the attributes possessed by the network resources 134. As the values of the attributes change, the administration tool 140 continuously monitors 620 the resources 134 and re-associates 624 the resources into new and/or different groups.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a non-transitory computer readable medium storing computer usable program code for performing operations that manage computing resources, the operations comprising:
   identifying at least one target attribute associated with a plurality of computing resources, each of the plurality of computing resources comprising an attribute value corresponding with the at least one target attribute;
   dynamically monitoring and collecting within a repository the attribute values of the at least one target attribute from the plurality of computing resources, wherein dynamically monitoring comprises detecting changes in the attribute values;
   determining, based on the collected attribute values, a set of two or more computing resources of the plurality of computing resources with the same target attribute values for the at least one target attribute;
   associating the determined set of computing resources with a group of computing resources;
   determining a desired management operation to be executed on the computing resources associated with the group of computing resources, the desired management operation selected from a stored set of operations associated with the group of computing resources;
   generating a single command comprising instructions for executing the desired operation; and
   simultaneously transmitting the single command across a network to each of the computing resources associated with the group of computing resources.

2. The computer program product of claim 1, the operations further comprising presenting the group of computing resources within a user interface.

3. The computer program product of claim 2, wherein the user interface is a graphical user interface.

4. The computer program product of claim 3, wherein presenting comprises displaying a container representation representative of the group of computing resources, the container representation comprising an indicator identifying computer resources within the group.

5. The computer program product of claim 1, the operations further comprising generating a report comprising one or more groups of computing resources and an indicator identifying computing resources within each group of computing resources.

6. The computer program product of claim 5, wherein the report comprises attribute values associated with each computing resource within each group of computing resources.

7. The computer program product of claim 1, the operations further comprising:
dynamically monitoring the attribute values of the at least one target attribute of the computing resources of the group of computing resources;
identifying a computing resource of the group of computing resources having a changed target attribute value; and
re-associating the computing resource having the changed target attribute value from the group of computing resources to another group of computing resources corresponding to the changed target attribute value.

8. The computer program product of claim 1, wherein the desired operation comprises rebooting the computing resources of the group of computing resources.

9. The computer program product of claim 1, wherein the desired operation comprises an action selected from the group consisting of:
rebooting the computing resources of the group of computing resources;
applying a software update to the computing resources of the group of computing resources;
displaying the computing resources of the group of computing resources;
modifying access rights for the computing resources of the group of computing resources; and
issuing a backup command to each of the computing resources of the group of computing resources.

10. The computer program product of claim 1, wherein the at least one target attribute comprises a composite of a plurality of resource attributes.

11. The computer program product of claim 10, wherein the plurality of resource attributes is selected from the group consisting of system attributes, physical attributes, static attributes, dynamic attributes, environment attributes, operational attributes, and user-defined attributes.

12. The computer program product of claim 1, the operations further comprising identifying an absent target attribute value wherein no computing resource from the repository possesses the absent target attribute value and designating an empty group of computing resources associated with the absent target attribute value.

13. The computer program product of claim 1, the operations further comprising monitoring dynamic and static attribute values of the one or more computing resources and storing the monitored dynamic and static attribute values in a repository.

14. A computer program product comprising a non-transitory computer readable medium storing computer usable program code for managing managed resources, the computer program product comprising:
computer usable program code for identifying a group of computing resources of a plurality of computing resources having a common attribute value associated with a target attribute of the plurality of computing resources;
computer usable program code for determining a plurality of sub-groups of the group, wherein each sub-group comprises computing resources of the group having a common sub-group attribute value associated with a target sub-group attribute of the computing resources of the group of computing resources distinct from the sub-group attribute values associated with the target sub-group attribute of the computing resources of the other sub-groups of the group of computing resources;
computer usable program code for dynamically monitoring and collecting within a repository the attribute values of the target attribute and the sub-group attribute values of the target sub-group attribute from the plurality of computing resources, wherein dynamically monitoring comprises detecting changes in the common attribute values and the sub-group attribute values;
computer usable program code for displaying the group of computing resources and an indicator of the computing resources of each sub-group;
computer usable program code for receiving a user-selected sub-group of the plurality of sub-groups and receiving a user-selected sub-group attribute value of the target sub-group attribute from a user;
computer usable program code for receiving from a user a user-selected management operation from a stored set of a plurality of predefined management operations each executable on the resources of the user-selected sub-group, wherein the stored set of the plurality of predefined management operations are associated with the user-selected sub-group; and
computer usable program code for generating a single command comprising instructions for executing the user-selected operation and simultaneously transmitting the single command across a network to the computing resources of the user-selected sub-group having the user-selected sub-group attribute value.

15. The computer program product of claim 14, wherein displaying the group of computing resources and the indicator of the computing resources of each sub-group comprises:
displaying a visual container on a computer screen for the group of computing resources;
displaying a label for the group of computing resources of the visual container; and
displaying the indicator for the computing resources of each sub-group in the visual container.

16. The computer program product of claim 15, wherein each indicator comprises a name for the corresponding sub-group and a token representative of computing resources of the sub-group.

17. The computer program product of claim 16, wherein the token is a count of the computing resources of the sub-group.

18. The computer program product of claim 16, wherein the token is a representation of the computing resources of the sub-group selected from the group consisting of a count, a label, a bar chart, a status flag, a highlighted label, a flashing label, an animation, a plurality of icons representative of the count of the of the computing resources of the sub-group, and combinations thereof.

19. The computer program product of claim 15, further comprising computer usable program code for receiving a selection of the group of computing resources from a user and wherein displaying the group of computing resources and an indicator of the computing resources of each sub-group further comprises formatting the visual container such that the selected group is visible to the user.

20. The computer program product of claim 15, wherein displaying a visual container on a computer screen for the group of computing resources comprises displaying a plurality of visual containers on a computer screen, each visual container being associated with a group of computing resources, and wherein the computer program product further comprises computer usable program code for receiving a selection of a computing resource and modifying at least one visual container to an expanded format in response to the at least one visual container having computing resources having an association with the selected computing resource.

21. The computer program product of claim 20, wherein the expanded format displays the computing resources of the group individually.

22. The computer program product of claim 20, further comprising computer usable program code for selecting the computing resources of the at least one visual container having an association with the selected computing resource.

23. The computer program product of claim 20, further comprising a computer usable program code for displaying the visual container in a collapsed format that displays an indicator of the computing resources of each sub-group.

24. The computer program product of claim 14, further comprising computer usable program code for identifying a target attribute value for which no resource exists and computer usable program code for displaying an empty group representative of that target attribute value.

25. The computer program product of claim 15, further comprising computer usable program code for determining the target sub-group attribute at run-time based on a user configured option.

26. A computer program product comprising a non-transitory computer readable medium storing computer usable program code for managing managed resources, the computer program product comprising:
   computer usable program code for generating a visual representation corresponding to a group of computing resources associated with a common target attribute, each of the plurality of computing resources of the group of computing resources comprising an attribute value corresponding with the common target attribute, the visual representation having an expanded format and a collapsed format;
   computer usable program code for dynamically monitoring and collecting within a repository attribute values of the common target attribute from the computing resources of the group of computing resources, wherein dynamically monitoring comprises detecting changes in the attribute values;
   computer usable program code for displaying the visual representation on a user interface, the visual representation associated with a format button;
   computer usable program code for receiving a user-selected attribute value from a user;
   computer usable program code for modifying the format of the visual representation based on computing resources of the group of computing resources having an attribute value of the common target attribute matching the user-selected attribute value;
   computer usable program code for receiving from a user a user-selected management operation from a stored set of a plurality of predefined management operations executable on the computing resources of the group of computing resources, the stored set of the plurality of predefined management operations being associated with the group of computing resources having an attribute value of the common target attribute matching the user-selected attribute value; and
   computer usable program code for generating a single command comprising instructions for executing the user-selected operation on the computing resources of the group having an attribute value of the common target attribute matching the user-selected attribute value and simultaneously transmitting the single command across a network to each computing resource of the group of computing resources having an attribute value of the common target attribute matching the user-selected attribute value for execution of the user-selected operation on the computing resources having an attribute value of the common target attribute matching the user-selected attribute value.

27. The computer program product of claim 26, wherein the expanded format displays an indicator for each computing resource of the group of computing resources and the collapsed format displays a label for the group of computing resources and an indicator of the computing resources of the group.

28. The computer program product of claim 27, wherein the group of computing resources is divided into a plurality of sub-groups of computing resources each comprising computing resources having a distinct sub-group attribute value of the common target attribute and wherein a collapsed format displays a label for the group of computing resources and an indicator of the computing resources of each sub-group of computing resources.

29. The computer program product of claim 28, wherein the indicator of the computing resources of each sub-group of computing resources comprises a name for the corresponding sub-group and a token representative of computing resources of the sub-group.

30. The computer program product of claim 26, further comprising computer usable program code for modifying the visual representation in response to a changed attribute value of the common target attribute for a computing resource such that the visual representation includes only those computing resources that presently have the attribute value of the target attribute matching the user-selected attribute value.

31. An apparatus for managing managed resources, the apparatus comprising:
   a repository configured to dynamically track and collect a plurality of attribute values corresponding with a plurality of target attributes associated with a plurality of network devices, wherein the repository is configured to detect changes in the plurality of attribute values;
   a discovery module configured to determine a plurality of sets of network devices of the plurality of network devices with each set of network devices comprising at least one network device having common attribute value of a distinct one of the plurality of target attributes;
   an association module configured to associate each set of network devices with a respective group of network devices defined by the common attribute value;
   a user interface operable by a user to select a desired management operation of a stored set of a plurality of management operations each associated with a group of network devices having a selected common attribute value, each management operation in the stored set of the plurality of management operations configured to be executed on network devices associated with the group of network devices having the selected common attribute value; and an administrative tool configured to generate a single command comprising instructions for executing the desired operation, and simultaneously transmit over a network the single command to each of the network devices associated with the group of network devices having the selected common attribute value;

wherein the repository, discovery module, association module, and user interface each comprise at least one of logic hardware and executable code, the executable code being stored on one or more non-transitory computer readable media.

32. The apparatus of claim 31, the association module further configured to associate network devices of one group into one or more sub-groups according to a sub-group target attribute.

33. The apparatus of claim 32, the association module further configured to select the sub-group attribute according to historical user selection patterns of sub-group target attributes.

34. The apparatus of claim 32, further comprising a display module configured to generate a visual representation corresponding to one or more groups and the one or more sub-groups in each group, the visual representation having an expanded format and a collapsed format.

35. A method for performing an analysis of a network comprising:
  executing an administration tool comprising a plurality of modules, the modules comprising:
  a repository configured to dynamically track and collect a plurality of attribute values corresponding with a plurality of target attributes associated with a plurality of network devices, wherein the repository is configured to detect changes in the plurality of attribute values;
  a discovery module configured to determine a plurality of sets of network devices of the plurality of network devices with each set of network devices comprising at least one network device having a common attribute value of a distinct one of the plurality of target attributes;
  an association module configured to associate each set of network devices with a respective group of network devices defined by the common attribute value;
  a user interface operable by a user to select a desired operation of a stored set of a plurality of management operations each associated with a group of network devices having a selected common attribute value, each management operation in the set of the plurality of management operations configured to be executed on network devices associated with the group of network devices having the selected common attribute value; and
  a command module configured to generate a single command comprising instructions for executing the desired operation, and simultaneously transmit over a network the single command to each of the network devices associated with the group of network devices having the selected common attribute value.

* * * * *